Patented Feb. 14, 1928.

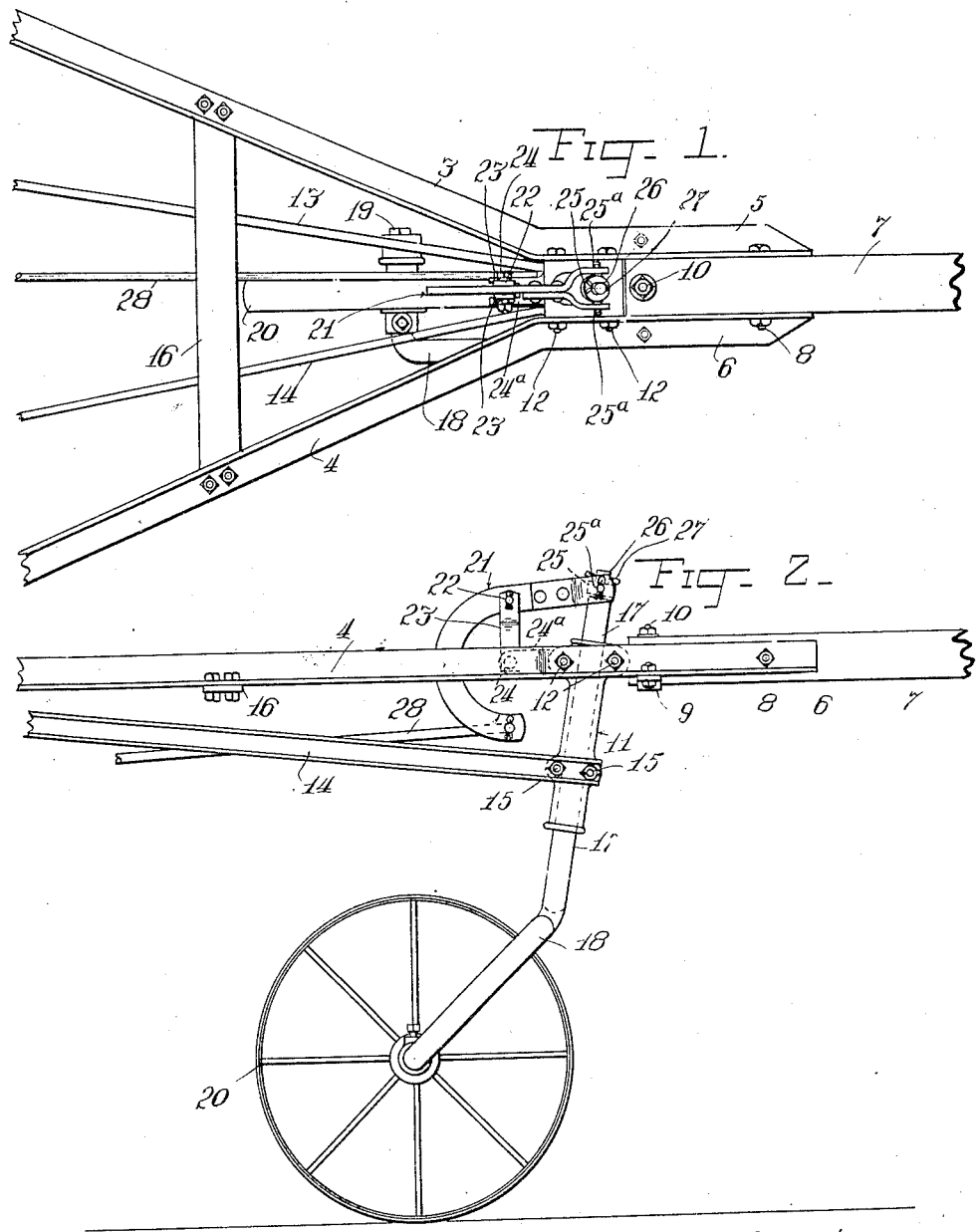

1,659,381

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

CULTIVATOR.

Application filed April 12, 1926. Serial No. 101,290.

My invention relates to cultivators and analogous implements having a fore truck for supporting the front of the frame, and it has particularly to do with such implements in which the fore truck comprises one or more ground wheels carried by a stem or spindle swivelled to rotate about an axis inclined downwardly and rearwardly and lying in a fore and aft vertical plane so that the weight of the fore part of the frame, resting on the inclined spindle, tends to steady the ground wheel or wheels and hold them in the line of draft. This is particularly advantageous where a single wheel is used, as a single trailing wheel connected with the frame to turn about a true vertical axis tends to whip sidewise and this side whip is quite annoying to both the operator and the horses as the cultivator does not run as steadily or ride as smoothly and the continued vibration of the wheel affects the neck-yoke and is apt to give the horses sore necks because of the continued sawing of the collars of the harness. A fore truck of the general type to which my present invention relates is shown and described in the pending application of Walter H. Silver, Serial No. 501,687, filed September 19, 1921.

Where fore trucks are used it is desirable that provision be made for vertically adjusting the front portion of the cultivator frame with reference to the truck to level the rigs so that they penetrate the soil uniformly for different depths of cultivation, and my present invention has to do particularly with the provision of convenient means by which the operator can readily adjust the front portion of the frame vertically with reference to a fore truck mounted to turn about a spindle inclined fore and aft, as above described. This object I accomplish as illustrated in the drawings and as hereinafter described. What I regard as new is set forth in the claims.

In the accompanying drawings—

Figure 1 is a plan view of the front part of a cultivator frame supported by a fore truck of the type shown in said Silver application having my improvements applied thereto, and Fig. 2 is a side elevation of the parts shown in Fig. 1.

Referring to the drawings, 3, 4 indicate the side members of the cultivator frame which, as shown in Fig. 1, converge forwardly their forward end portions 5, 6 being bent at an angle so that they are parallel and are spaced far enough apart to receive between them a tongue 7, which is pivotally connected to them by a horizontal pivot 8, so that the tongue may rock vertically about said pivot. To limit the downward movement of the rear end of the tongue, a cross strap 9 is provided which is secured to the under sides of the frame portions 5, 6, as best shown in Fig. 2. The rear end of the tongue is not connected to said strap, but it is preferably provided with a vertical bolt 10 which passes through the tongue and tends to prevent it from splitting.

Secured to the forward portion of the frame between the members 5, 6 thereof is a sleeve 11 set in an inclined position with its axis inclined fore and aft and its upper end in advance of its lower end, as clearly shown in Fig. 2. Bolts 12 serve to secure the upper portion of said sleeve to the frame members 5, 6. The lower portion of said sleeve is braced by braces 13, 14, the forward ends of which are connected to said sleeve by bolts 15, while their rear ends are connected with the frame in any convenient way. By this means the sleeve 11 is firmly secured in position on the frame. In the illustrated construction, the side members 3, 4 of the frame are braced by a cross brace 16.

The sleeve 11 forms a swivel bearing for an upright stem or spindle 17 which constitutes part of the fore truck. The lower portion of said spindle is offset as shown at 18, and at its lower end said offset portion is bent at right angles to provide a spindle 19 on which is mounted a ground wheel 20. By this arrangement the wheel 20 acts as a trailing caster wheel and normally assumes a position in the line of draft, although it may swing laterally when the cultivator is steered to one side or the other or when said wheel encounters obstacles tending to swerve it from its direct course.

The forward portion of the cultivator frame is adjustably supported on the upper end of the stem 17 by means of a lever 21 which is pivotally connected by a pivot 22 with a fore and aft swinging support in the form of a link 23 connected at its lower end with the frame by means of a pivot 24. Preferably said pivot is secured to an arm 24ª that is integral with and extends rearwardly from the upper portion of the sleeve 11, as indicated by dotted lines in Fig. 2. The upper end of the lever 21 extends forward from the pivot 22 and is bifurcated, as shown in Fig. 1, for connection with trunnions 25ᵃ at opposite sides of a collar 25 that is swivelled upon the reduced upper end 26 of the stem 17, and is held against displacement by a cotter pin 27. The collar 25 is adapted to bear against the shoulder formed at the base of the reduced portion 26 of the stem, which forms an abutment to take the downward thrust of the front end of the lever when it is operated to lift the front end of the frame.

The rear end of the lever 21 is curved so that it extends downward and forward, as best shown in Fig. 2, and has connected therewith an operating rod 28 which extends back to some point where it may be conveniently operated, and it is provided with suitable locking means so that the lever 21 may be held in its different positions of adjustment. Preferably the rear end of said rod is connected with a lever mounted on the cultivator frame and provided with the usual dog and sector locking mechanism.

The collar 25 constitutes the fulcrum of the lever 21, and the weight of the front portion of the frame is applied to said lever through the link 23. It will be apparent, therefore, that when the lower end of the lever is moved rearwardly, the frame will be moved upward, thereby moving the bearing sleeve 11 longitudinally of the stem 17, and as an incident of such movement, the collar 25 will be moved fore and aft closer to the pivot 24. Consequently the link 23 will be caused to swing rearwardly about said pivot, thereby correspondingly moving the lever 21 bodily fore and aft to compensate for the adjusted position of the sleeve 11 on the stem 17. When the frame is lowered the lever is of course moved bodily in the opposite direction.

It will be seen that the construction described comprises a lever for vertically adjusting the front part of the frame on the fore truck, which is fulcrumed on said truck and sustains the weight of the frame, but nevertheless is capable of moving bodily fore and aft to compensate for the fore and aft movement of the connections relatively to each other that is incident to longitudinal adjustment of the sleeve 11 on the inclined stem 17. This I believe to be broadly new. Therefore, I wish it to be understood that my invention is not limited to the particular construction shown and described, but includes such modifications or variations thereof as would occur to those familiar with the art.

The term "cultivator" as used in the foregoing description and in the appended claims is intended to comprehend not only cultivators properly so called, but also any and all other implements in connection with which a fore truck of the character described may be advantageously used.

What I claim as my invention and desire to secure by Letters Patent, is—

1. The combination with a cultivator frame of a fore truck comprising a stem and a ground wheel connected with said stem, means connected with said frame and forming a swivel bearing for said stem inclined fore and aft, said bearing and stem being movable longitudinally relatively to each other to adjust the frame vertically, and a lever connected with the frame and the stem and operable to adjust the bearing longitudinally of the stem.

2. The combination with a cultivator frame of a fore truck comprising a stem and a ground wheel connected with said stem, means connected with said frame and forming a swivel bearing for said stem inclined fore and aft, said bearing and stem being movable longitudinally relatively to each other to adjust the frame vertically, and a lever fulcrumed on the stem and connected with the frame for moving the bearing longitudinally of said stem.

3. The combination with a cultivator frame of a fore truck comprising a stem and a ground wheel connected with said stem, means connected with said frame and forming a swivel bearing for said stem inclined fore and aft, said bearing and stem being movable longitudinally relatively to each other to adjust the frame vertically, and a lever fulcrumed on the upper end of said stem and connected with the frame to move fore and aft relatively thereto when the frame is adjusted vertically.

4. The combination with a cultivator frame of a fore truck comprising a stem, and a ground wheel connected with said stem, means connected with said frame and forming a swivel bearing for said stem inclined fore and aft, said bearing and stem being movable longitudinally relatively to each other to adjust the frame vertically, a collar swivelled on the upper end of said stem, and a lever fulcrumed on said collar and having an intermediate connection with the frame, for moving the bearing longitudinally of said stem.

5. The combination with a cultivator frame and a sleeve secured to the front part of said frame in a position inclined fore and aft, of a fore truck comprising a stem swivelled in and movable longitudinally of said sleeve and a ground wheel carried at the lower end of said stem, a collar pivotally mounted on the upper end of said stem, a lever connected with said collar and fulcrumed on said stem, and a link pivoted on the frame to swing fore and aft, and connected with said lever at one side of its connection with said collar.

6. The combination with a cultivator frame and a sleeve secured to the front part of said frame in a position inclined fore and aft, of a fore truck comprising a stem swivelled in said sleeve and a ground wheel carried at the lower end of said stem, a collar mounted on the upper end of said stem, a link pivoted on the frame to swing fore and aft, and a lever connected intermediately with said link and having its forward end portion connected with said collar, the rear end portion of said lever being extended downward and forward, and operating means connected with the rear end portion of said lever.

CARL G. STRANDLUND.